United States Patent Office 2,919,197
Patented Dec. 29, 1959

2,919,197
METHOD OF PREPARING OIL-IN-WATER EMULSIONS

Hendrik Jan Duin, Zwijndrecht, and Jacob Arie Schaap, Dordrecht, Netherlands, assignors to Lever Brothers Company, New York, N.Y., a corporation of Maine No Drawing. Application February 23, 1955
Serial No. 490,112
Claims priority, application Great Britain February 26, 1954

8 Claims. (Cl. 99—123)

This invention relates to emulsions which are fatty products and more particularly edible fatty products, and also to their methods of preparation. The fatty products made in accordance with the present invention consist of or contain highly packed oil-in-water emulsions.

By a highly packed emulsion is meant an oil-in-water emulsion containing at least 74% by weight of oil, in which substantially every particle of the dispersed oil phase is in contact with adjacent particles.

It has always been desirable to prepare highly packed fatty oil-in-water emulsions other than plastic cream. They could serve as substitutes for plastic cream and could be used as a highly concentrated starting material to make artificial cream, artificial milk, bakery ingredients, salad sauces, mayonnaise, or technical emulsions like dubbin, pesticidal products, emulsion paints, by dilution with aqueous liquids. However, there have always been great difficulties in preparing such emulsions and there are only a few instances of their successful preparation, since emulsions containing over 74% of the dispersed phase tend to become unstable. Mayonnaise is one example of an oil-in-water emulsion containing more than 74% of the dispersed phase; it is being manufactured with the aid of egg yolk as an emulsifier. In U.S. specification 2,609,300 the manufacture of highly concentrated oil-in-water emulsions for use as bread spreads has been described. These emulsions are prepared with the aid of a fatty acid substituted protein hydrolyzate or of fatty acid derivatives of a protein substituted hydroxylamine as emulsifier.

It has now been discovered that a great number of other emulsifiers are suitable for preparing highly concentrated oil-in-water emulsions, if the right conditions are observed.

The discovery that a great number of emulsifiers enable highly packed oil-in-water emulsions to be prepared makes it possible to choose an emulsifier meeting specific requirements in any particular case, for instance when edible emulsions are desired. Another advantage lies in the circumstance that the emulsions according to the invention may be diluted with water of the same temperature as the emulsion at any stage, for example just before use.

The invention consists in a method of preparing a fatty product comprising preparing a highly packed heat stable oil-in-water emulsion by adding oil to an aqueous phase at an elevated temperature with intensive stirring, the emulsion having dissolved therein at least one water soluble emulsifying agent containing an anionic or a nonionic capillary active substance having pronounced hydrophilic properties of the general formula RXY in which R is a hydrocarbon radical containing at least 8 carbon atoms in a straight chain, X is a radical taken from the class comprising —O—, —S—, —N—, —CH₂—

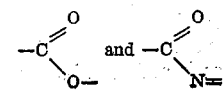

Y is an inorganic or organic radical containing at least one water solubilizing group of the class comprising

—SO₃M, —PO₃M₂ and substituted or unsubstituted polyoxyalkylene where M is hydrogen, and alkali metal, ammonium or a substituted ammonium radical, the capillary active substance being other than a fatty acid substituted protein hydrolyzate.

With each capillary active substance the desired result is obtained when the pH of the aqueous phase is within a range which is characteristic of the substance. This pH is generally within the range from 5 to 11.

The emulsion should be prepared at elevated temperatures to ensure that the oil is completely liquid, and to ensure that the emulsion can be stirred sufficiently intensely. The temperatures to be used depend on the composition of the oil and the viscosity of the emulsion. This latter property is governed to some extent by the nature of the emulsifying agent. In many cases temperatures in the neighborhood of 60° C. have been found suitable, but in some cases a temperature of 40° C. or even less may be used. Sometimes temperatures approaching a 100° C. may be used. It is possible to pasteurize or sterilize the oil-in-water emulsion. Intensive stirring may be effected by any suitable apparatus for instance a turbo mixer working at 3000 revolutions per minute. Preferably the emulsion after having been prepared is homogenized.

The oil content of the highly packed oil-in-water emulsion should not be less than 74%. Emulsions containing 80% of oil and more may however easily be prepared.

A number of the capillary active substances referred to above give highly packed oil-in-water emulsions which on solidifying and mechanically working result in a partially inverted oil-in-water emulsion as explained in more detail in copending application No. 490,111. In these cases the emulsion when cooled stays in the oil-in-water form provided mechanical working is avoided. In other cases, notably when the capillary active substance used is strongly hydrophilic, partial phase inversion on mechanical working after solidification only results when a second substance having emulsifying and lipophilic properties is added. Highly packed oil-in-water emulsions containing such a second substance form also part of the invention. Emulsions which do not invert on mechanical working after cooling, notably those prepared from oils which remain liquid at room temperature and below, form also part of the invention.

Capillary active substances for use in the invention may be anionic or nonionic surface active agents.

Other examples of suitable anionic surface active agents are fatty acid substituted aminocarboxylic acids of the general formula

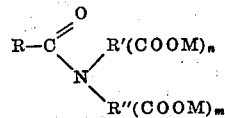

in which

R is a hydrocarbon radical containing at least 8 carbon atoms,

R' is a hydrocarbon radical containing from 1 to 5 carbon atoms,

R" is hydrogen or a hydrocarbon radical containing from 1 to 5 carbon atoms, which may be linked to R', M is hydrogen, alkali metal, ammonium or a substituted ammonium radical, m is 0 to 3 and n is 1 to 3.

Such substances are for example sodium N-stearoyl sarcosine, sodium N-lauroyl sarcosine, sodium N-oleoyl sarcosine, sodium N-stearoyl glutaminate, sodium N-stearoyl proline, which can all be used at a pH value of 5 and higher, and sodium N-stearoyl glycine, which can be used at a pH value of 7 and higher.

Still other examples of suitable anionic surface active substances are the partial esters of higher fatty alcohols and polybasic inorganic acids such as phosphoric acid. For example mono-stearyl phosphate may be used at a pH value of 5 and higher.

Examples of nonionic surface active agents for use in the invention are compounds of the general formula $$RXY$$

in which

R is a hydrocarbon radical containing at least 8 carbon atoms in a straight chain, X is a radical taken from the class comprising —O— and $$-C\diagup^{O}_{\diagdown O-}$$

Y is an organic radical containing a substituted or unsubstituted polyoxyalkylene group.

Y is preferably a polyoxyethylene group containing at least 20 oxyethylene groups.

Such substances are for example the polyoxyalkylene derivatives of higher fatty alcohols, such as octadecyl-polyoxyethylene ether. One of the advantages of the use of nonionic emulsifiers is that they can mostly be used over a wide range of pH-values, for example 5 to 11.

It will be clear from the foregoing that the capillary active substances may also be used in combination with each other. They may also be used together with thickening agents such as for example carboxymethylcellulose.

The invention will now be illustrated by means of the following examples. The size of the oil particles as mentioned in Example 1 is ascertained by observing the emulsion after dilution with water of the same temperature as the emulsion under the microscope. pH values are measured at 50° C. with the potentiometer. Stirring is carried out by a turbo-mixer rotating at 3000 revolutions per minute.

*Example 1*

An aqueous phase was prepared by dissolving 1 part of stearic acid in distilled water containing a sufficient amount of sodium hydroxide to neutralize the acid.

Citric acid was added to bring the pH to between 7.5 and 8 and distilled water was added to make the aqueous phase up to 40 parts.

An 80% oil-in-water emulsion was prepared by slowly adding 160 parts soyabean oil, at first in small portions to the aqueous phase with stirring by means of a turbo-mixer. The emulsion obtained was homogenized in two stages using 140 and 60 atmospheres pressure respectively.

The resultant emulsion was stable and the dispersed fat particles were mainly from 1 to 5 microns with only a small fraction up to 25 microns.

*Example 2*

The procedure of Example 1 was carried out with 40 parts of an aqueous phase containing 1 part polyglycerol steroyl ether (a product known under the name Emulsogen-O and sold by the Anorgano Cy., Germany), and 160 parts of linseed oil.

The stable 80% oil-in-water emulsion obtained had similar properties to that described in Example 1.

*Example 3*

The procedure of Example 1 was carried out with 40 parts of an aqueous phase containing 1.5 parts sodium lauroyl sarcoside, sufficient citric acid to bring the pH of the aqueous phase to 5.5 and 160 parts of a fat mixture with the following composition:

| | Percent |
|---|---|
| Soyabean oil | 22.5 |
| Coconut oil | 18 |
| Palm oil | 13 |
| Palmkernel oil | 10 |
| Hardened whale oil, M.P. 35° C. | 22.5 |
| Hardened palm oil, M.P. 45° C. | 10 |
| Lard | 4 |

The resulting 80% oil-in-water emulsion was stable and had similar properties to that described in Example 1.

*Example 4*

The procedure of Example 1 was carried out using an aqueous phase containing 0.5% sodium oleoyl sarcoside calculated on the total weight of emulsion desired and the same fat mixture as in Example 3. 0.5% sorbitan mono-oleate calculated on the weight of emulsion (a product from the Atlas Cy., known under the name of "Span 80") was incorporated in the product.

An emulsion was similar properties to that prepared in the above examples was obtained.

We claim:

1. A method of preparing a highly packed heat stable oil-in-water emulsion containing at least 74% by volume of oil which comprises adding a faty oil to an aqueous phase in the presence of a water-soluble emulsifying agent at an elevated temperature at which the oil is liquid and in any case no greater than 100° C. with intensive stirring, the fatty oil comprising at least 74% by volume of the mixture of oil and aqueous phase, the aqueous phase having a pH within the range 5 to 11, and the water-soluble emulsifying agent containing a substance selected from the group consisting of anionic and non-ionic capillary active substances having pronounced hydrophilic properties and being a condensation product of a higher fatty acid and a lower amino carboxylic acid of the general formula $$R-C\diagup^{O}_{\diagdown N\diagup^{R'(COOM)_n}_{\diagdown R''(COOM)_m}}$$

in which

R is a hydrocarbon radical containing at least 8 carbon atoms in a straight chain, R′ is a hydrocarbon radical containing from 1 to 5 carbon atoms, R″ is a radical selected from the group consisting of hydrogen and hydrocarbon radicals containing from 1 to 5 carbon atoms, which may be linked to R′, M is a radical selected from the group consisting of hydrogen, alkali metals, ammonium and substituted ammonium radicals, $m$ is 0 to 3, and $n$ is 1 to 3.

2. A method as claimed in claim 1 in which the capillary active substance is sodium N-stearoyl sarcosine.

3. A method as claimed in claim 1 in which the capillary active substance is sodium N-lauroyl sarcosine.

4. A method as claimed in claim 1 in which the capillary active substance is sodium N-oleoyl sarcosine.

5. A method as claimed in claim 1 in which the capillary active substance is sodium N-stearoyl glutaminate.

6. A method as claimed in claim 1 in which the capillary active substance is sodium N-stearoyl proline.

7. A method as claimed in claim 1 in which the capillary active substance is sodium N-stearoyl glycine.

8. A method as claimed in claim 1 in which the emulsifying agent contains as well as the capillary active substance a substance having emulsifying and lipophilic properties.

References Cited in the file of this patent

UNITED STATES PATENTS

| | | |
|---|---|---|
| 1,917,258 | Harris | July 11, 1933 |
| 2,047,066 | Glietenberg | July 7, 1936 |
| 2,063,987 | Dreyfus | Dec. 15, 1936 |
| 2,098,010 | Newton et al. | Nov. 2, 1937 |
| 2,197,457 | Werk et al. | Apr. 16, 1940 |
| 2,330,986 | Miller et al. | Oct. 5, 1943 |
| 2,422,486 | Johnston | June 17, 1947 |
| 2,508,393 | Jaeger | May 23, 1950 |
| 2,590,046 | Schoenfeld | Mar. 18, 1952 |
| 2,609,300 | Storrs | Sept. 2, 1952 |

FOREIGN PATENTS

| | | |
|---|---|---|
| 650,481 | Great Britain | Feb. 28, 1951 |